United States Patent
Kishimoto et al.

[11] Patent Number: 5,881,475
[45] Date of Patent: Mar. 16, 1999

[54] NON-DRAINING TYPE HUMAN WASTE DISPOSAL METHOD BY PULSE COMBUSTION DRYING

[75] Inventors: Ken Kishimoto, 509, 26-12, Huda 1 - Chome, Chohu , Tokyo 182; Atsuyoshi Kubotani, Amagasaki; Takashi Enkawa, Amagasaki; Tateo Asatsu, Amagasaki; Toshiaki Kikuchi, Amagasaki; Shunji Kishima, Amagasaki; Hitoshi Touji, Amagasaki, all of Japan

[73] Assignees: Osaka Fuji Kogyo Kabushiki Kaisya, Hyogo; Ken Kishimoto, Tokyo, both of Japan

[21] Appl. No.: 945,605

[22] PCT Filed: Feb. 28, 1997

[86] PCT No.: PCT/JP97/00621

§ 371 Date: Oct. 28, 1997

§ 102(e) Date: Oct. 28, 1997

[87] PCT Pub. No.: WO97/31862

PCT Pub. Date: Sep. 4, 1997

[30] Foreign Application Priority Data

Feb. 29, 1996 [JP] Japan ................................. 8-042998

[51] Int. Cl.$^6$ ........................................................ F26B 7/00
[52] U.S. Cl. ................................ 34/381; 34/390; 34/478; 4/111.4
[58] Field of Search ............................... 34/380, 381, 389, 34/390, 426, 427, 478, 60, 95; 110/248, 255, 267; 4/111.1, 111.4

[56] References Cited

U.S. PATENT DOCUMENTS 3,855,645  12/1974  West, Jr. ................................. 4/111.4
3,885,254  5/1975   West, Jr. ................................. 4/111.4
3,911,506  10/1975  West, Jr. ................................. 4/111.4
5,257,466  11/1993  Kishi ......................................... 34/95
5,357,880  10/1994  Kishi ..................................... 34/95 X
5,370,065  12/1994  Christensen ............................. 110/346
5,698,095  12/1997  Kami ....................................... 210/173

FOREIGN PATENT DOCUMENTS 53-7866     1/1978   Japan .
58-210900   12/1983  Japan .
3-31290     3/1991   Japan .

*Primary Examiner*—Henry Bennett
*Assistant Examiner*—Steve Gravini
*Attorney, Agent, or Firm*—Pillsbury Madison & Sutro LLP

[57] ABSTRACT

This method relates to a non-draining type human waste disposal by pulse combustion drying. In the method, a pulsating combustion gas is discharged downward into a vertically cylindrical dryer from a pulse combustor disposed at the top of the dryer, and making contact the pulsating combustion gas with residue-removed human waste, digester chamber sludges or their mixtures charged therein, turning the charged matters to dried powder and steam under the dryer conditions of 120°–150° C., withdrawing the dried powder from the bottom of the dryer and the combustion gas containing steam from a lower side of the dryer, dust-removing the combustion gas containing steam maintained at 120°–150° C., deodorizing the dust-removed combustion gas, and exhausting the deodorized gas into the air. As an alternative method, the dried powder and the combustion gas containing steam are withdrawn from the bottom of the dryer, the withdrawn material maintained at 120°–150° C. is charged to a incinerator, odorous components and the dried powder entrained in the combustion gas containing steam are incinerated under supply of a fuel and combustion air, dust-removing the incinerated matters, and exhausting the dust-removed gas into the air.

4 Claims, 3 Drawing Sheets

NON-DRAINING TYPE HUMAN WASTE DISPOSAL METHOD BY PULSE COMBUSTION DRYING

This application is the national phase of international application PCT/JP97/00621, filed Feb. 28, 1997 which designated the U.S.

1. Technical Field

The present invention relates to a method for treatment of human waste, and specifically to a non-draining type human waste disposal method without discharging drainage outwardly.

2. Background Art

For treatments of human waste, anaerobe digestion methods and aerobic digestion methods are employed widely, however, drainages therefrom must be subjected further to a standard denitrification, high-load denitrification, membrane treatment and the like in order make them allowable to be drained. Among these treatments, membrane treatments are prime these days. In these conventional treating methods of human waste, there are such problems as a large amount drainage (about 97% of human waste or sludge of digester chamber is water); a wide installation area; difficulty in securing the installation site; a large initial cost; a large maintenance cost of membrane treatments (for exchanging membrane); necessities for sludge treating facilities; difficulties in reconstructing old human waste treatment facilities and requiring high costs; and difficulties in responding to varied human waste-sludge ratios.

The present invention aims at providing a non-draining type human waste disposal method which enables a reduced installation area and no outside discharge of the drainage.

DISCLOSURE OF THE INVENTION

A non-draining type human waste disposal method according to the present invention comprises steps of discharging downward a pulsating combustion gas into a vertically cylindrical dryer from a pulse combustor disposed at the top of the dryer, making contact the pulsating combustion gas with residue-removed human waste, digester chamber sludges or their mixtures charged therein, turning the charged matters to dried powder and steam under the dryer conditions of 120°–150° C., withdrawing the dried powder from the bottom of the dryer, withdrawing the combustion gas containing steam from a lower side of the dryer, removing dust from the combustion gas containing steam and maintained at 120°–150° C., deodorizing the dust-removed combustion gas, and exhausting the deodorized gas into the air. All the water contained in the human waste or digester chamber sludges is discharged as steam. As an alternative, the method may include the steps of withdrawing the dried powder and the combustion gas containing steam from bottom of the dryer, charging the withdrawn material maintained at 120°–150° C. to an incinerator, incinerating odorous components and the dried powder entrained in the combustion gas containing steam under supply of a fuel and combustion air, removing dust from the incineration waste gas, and exhausting the dust-removed gas into the air. In this case, the dried powder is incinerated to leave the ash only, which reduces the volume of solid exhausts so remarkably.

BEST MODE FOR CARRYING OUT THE INVENTION

Figure 1:
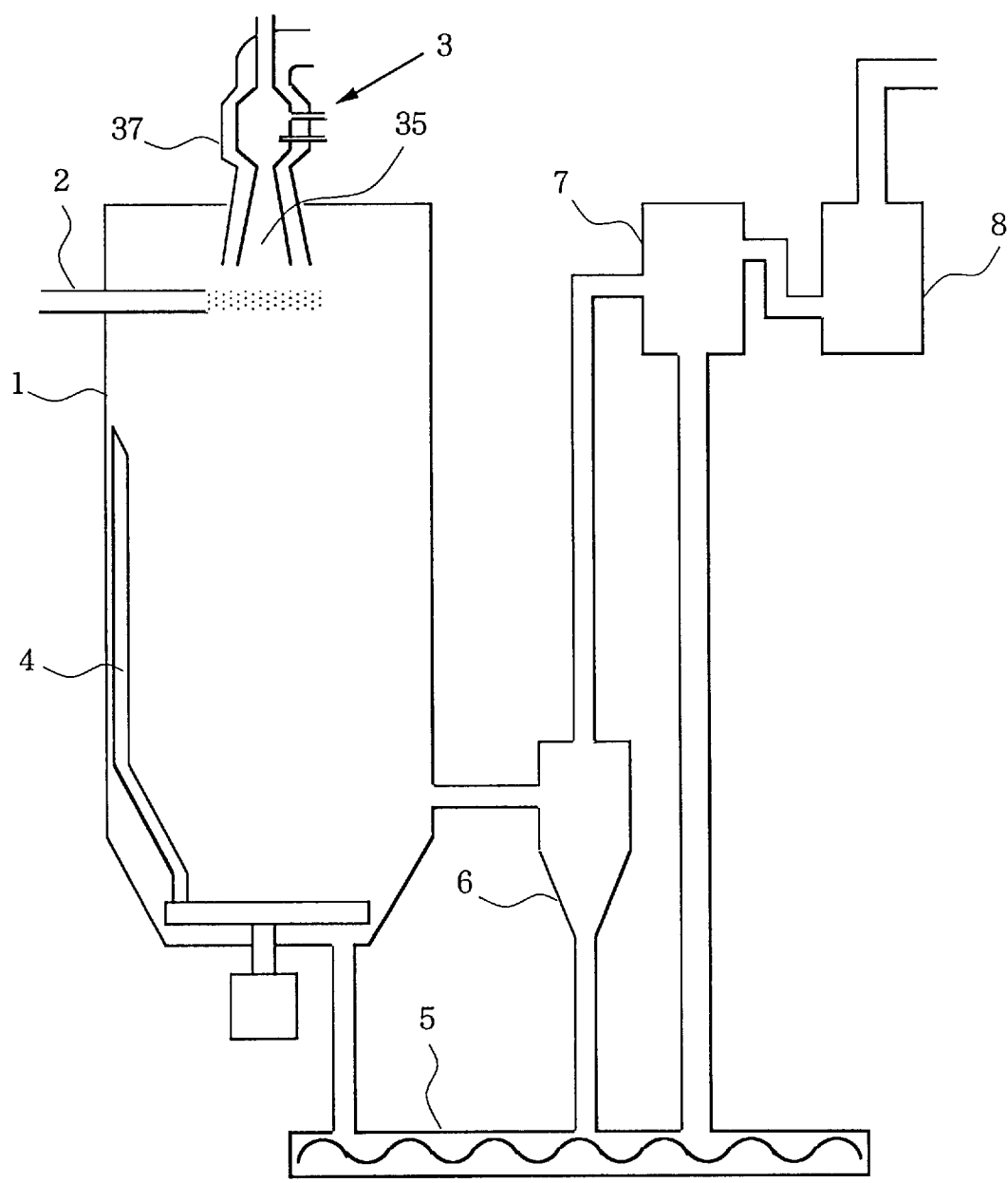
FIG. 1 shows an embodiment of the invention.

Human waste is subjected to pre-treatments as follows. Human waste carried by tank lorries is collected in receiving tanks, human waste residues are separated by passing the human waste through a primary human waste screen (coarse) and a secondary human waste screen (fine), and the screen-passed human waste is stored in a storage tank. The stored human waste is crushed with a human waste residue crushing pump, the crushed human waste is passed through a 5 mm-mesh tertiary human waste screen to remove further residues, and the residue-removed human waste is stored in a service tank. An embodiment of the present invention will be illustrated hereunder by use of FIG. 1. Human waste stored in a service tank (not shown) is charged through a human waste supply pump (not shown) to the human waste feeder 2 of the vertically cylindrical dryer 1 to be sprayed toward a pulsating combustion gas blown downward from the pulsating combustion gas exhausting pipe 35 of the pulse combustor 3 disposed at the top of the dryer, and the sprayed human waste makes contact with the combustion gas. Since the pulsating combustion gas itself is as hot as over 1000° C., the gas may better be supplied to the dryer at 500°–600° C. after being mixed with secondary air. As most solid matters of human waste contain cell membranes, evaporation of water inside of cell membranes takes time under ordinary drying with hot gases. Pulse combustion gases pulsate at 50–700 cycles (Hz), usually at 100–150 cycles (Hz), and are accompanied with sound wave and pressure wave. By their effects, the cell membranes of human waste are destroyed rapidly and dehydrated instantly to turn the human waste into dry powder and steam. The dryer is operated at the temperature conditions of above 100° C. for not to cause bedewing and corrosion by the combustion gas but below 250° C. for not to cause ignition of the dried powder, from which an operation at 120°–150° C. is preferred. When the pulsating combustion gas contacts in the dryer with human waste of about 97% water content, the human waste is dehydrated instantly and the temperature in the dryer turns to 120°–150° C. Temperatures in the dryer can be regulated arbitrary by controlling amount of the fuel, amount of the secondary air added to the pulsating combustion gas and the feeding rate of human waste. Dried powders having a relatively large specific weight precipitate by themselves on the bottom portion of the dryer, collected by the scraper 4, and discharged with the screw conveyer 5 from the bottom portion. Though the dried powder is fibrous or particulate and is not sticky, the powder is scraped from the wall of dryer with the scraper and discharged with the screw conveyer from bottom portion of the dryer. Dried powders having a relatively small specific weight are removed while passing together with the combustion gas through the primary dust remover 6 and the secondary dust remover 7, and discharged with the screw conveyer 5. The dust-removed combustion gas is sucked with a suction fan (not shown), deodorized with the deodorizing apparatus 8, and discharged into the air. Combustion gas containing steam from the dryer is maintained at temperatures above the dew point to be subjected to dust-removing and then deodorizing. Though the above is illustrated by use of human waste, digester chamber sludges and its mixture with human waste can be treated similarly.

As for treatments of dried powders discharged with the screw conveyer 5, powders are collected with a conveyer into a hopper, discharged therefrom quantitatively to a pelletizer to be solidified into pellets, and the pellet is incinerated in a incinerator along with human waste residues recovered with the primary, secondary and tertiary screens. Solid materials in the total human waste is about 3%. Calorific power of the human waste residue recovered with the primary, secondary and tertiary screens is about 6000 kcal/kg; calorific power of the dried powder collected with scraper or primary dust remover is about 4000 kcal/kg, true specific gravity is 1.55 and bulk density is 0.08; and calorific power of the dried powder collected with the secondary dust remover is about 2250 kcal/kg, true specific gravity is 1.59 and bulk density is 0.22.

Figure 2:
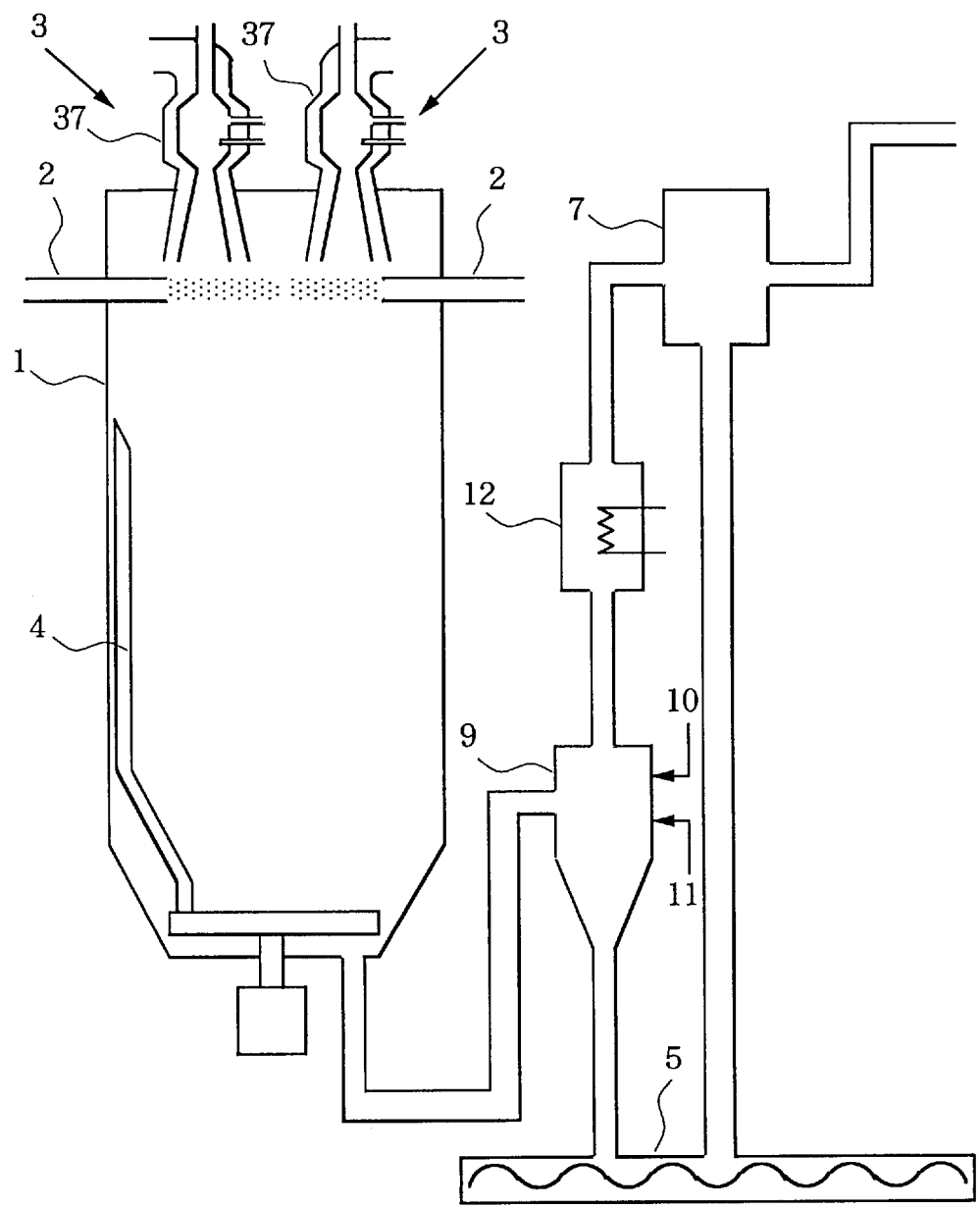
FIG. 2 shows another embodiment of the invention.

FIG. 2 shows another embodiment of the present invention, in which two sets of the pulse combustor 3 are installed in the dryer 1. The human waste separated from residues, digester chamber sludges and a mixture thereof are sprayed and made contact with the pulsating combustion gas under the conditions of 120°–150° C. in the dryer to turn them into the dried powder and steam, in the same manner as illustrated in FIG. 1. The dried powder and the combustion gas containing steam are withdrawn from the bottom portion of the dryer, the dried powder maintained at 120°–150° C. is charged to the dried powder combustion facility 9, dried powder entrained in the combustion gas and odorous components are incinerated at 600°–800° C. under supply of the fuel 10 and incinerating air 11, dust removed with the dust remover 7, and discharged in the air. The heat of combustion is recovered with the heat recovering facility 12 to be utilized effectively. In this embodiment, since odorous components in exhaust gases are incinerated and removed, no need for installing separately a deodorizing facility. Amount of ash after incineration is about 0.1% of the human waste or digester chamber sludges.

A pulsating combustion gas is a hot combustion gas generated by a so-called pulse combustor and the gas is pulsating generally at the rate of 50–700 cycles per second. When a humidified material is introduced into the atmosphere of the pulsating combustion gas, the material is subjected not only to the drying effect by the hot combustion gas but also to physical impulse actions (sonic power and pressure, etc.) by the rapidly pulsating gas, and the humidified material turns instantly to dehydrated material. Thus, dryers for dehydrating humidified materials by use of pulse combustors as the source of hot gas are calling attention.

Figure 3:
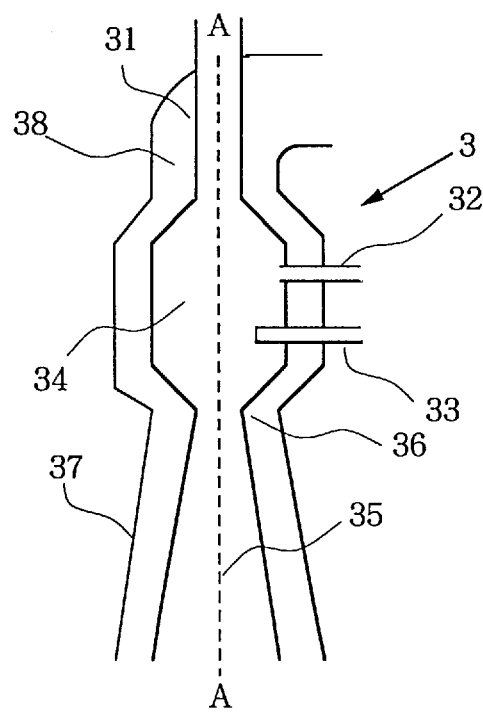
FIG. 3 is a cross-sectional view of an embodiment of a pulse combustor employable in the present invention.

Pulse combustors are developed based on the jet engine technology, and numerous types of pulse combustors are developed for drying humidified materials. An example of the pulse combustors is disclosed in Japanese Patent Publication No. 6-33939 as will be explained hereunder. In FIG. 3, the pulse combustor 3 has sequentially on the same axis A—A a combustion chamber 34 equipped with at least one air charging pipe 31, at least one fuel charging pipe 32 and at least one igniting means 33, and a combustion gas exhaust pipe 35 shaped to have a gradually enlarging outlet, and the combustion chamber is connected with the combustion gas exhaust pipe by means of a constricted portion 36. For the igniting means 33, an electric igniter (ignition plug) or a pilot flame can be used. For pulse combustors mentioned in FIGS. 1–3, a jacket 37 is disposed around the combustor, and the secondary air is injected in the jacket for cooling the combustor body together with for heating the secondary air, and the preheated secondary air is mixed with combustion gas blowing from the exhaust gas pipe 35, so as the mixed gas is able to control temperatures of the combustion gas to be charged into the drying room. In the present invention, pulsating combustion gases generated not only by this type of pulse combustors but also by pulse combustors of different types are employable similarly.

At the start-up of the pulse combustor, the combustion chamber 34 is firstly filled with air from the air charging pipe 31 and mist of fuel like diesel oil is sprayed from the fuel charging pipe 32. Under the condition, spark generated by the electric igniter 33 causes an explosive combustion of the fuel to drive out the hot combustion gas to the exhaust pipe 35. During the combustion, the charging of air and fuel to the combustion chamber 34 is interrupted temporarily due to a momentary high pressure in the combustion chamber, but the charging resumes due to a reduced pressure in the combustion chamber 34 caused by driving out of the combustion gas to the exhaust pipe 35, and the explosive combustion by ignition and formation of hot gas are repeated. As the result of these intermittent explosions, pulsating hot gas and sound are generated. A humidified material charged into or at the outlet of the exhaust pipe 35 is subjected to not only drying thereof by the hot combustion gas but also to physical impulse actions (sonic power and pressure etc.) by the rapidly pulsating gas to turn instantly into a dehydrated material. In course of time, the pulse combustor thus started becomes to proceed the intermittent explosive combustion of the air and fuel charged without being ignited by the electric igniter, thanks to the automatic ignition by contact with the heated inside wall of the combustion chamber 34 as similarly as the working principle of hot-bulb engines. Under the state, the electrical ignition by the igniter can be turned-off without interrupting the continued operation.

INDUSTRIAL APPLICATION

1) Human waste and digester chamber sludges are treated without dilution to be dried instantly under a high heat efficiency to turn into the dried powder and steam, and no drainage is generated.
2) The equipment and treating method are simplified, and construction cost of the system or the installation area are around ⅓–¼ of those for wet treating methods.
3) In the embodiment shown by FIG. 2, instant drying of human waste, incineration of dried powder (solid matter contained in human waste) and deodorization of combustion gases can be accomplished simultaneously.
4) Automatic control with computers is feasible, and the maintenance of facilities is simple.

We claim:

1. A non-draining type human waste disposal method comprising steps of discharging downward a pulsating combustion gas into a vertically cylindrical dryer from a pulse combustor disposed at the top of the dryer, making contact the pulsating combustion gas with residue-removed human waste, digester chamber sludges or their mixtures charged therein, turning the charged matters to dried powder and steam under the dryer temperature conditions of 120°–150° C., withdrawing the dried powder from the bottom of the dryer, withdrawing the combustion gas containing steam from a lower side of the dryer, maintaining at 120°–150° C. the combustion gas containing steam and subjecting to dust-removing, deodorizing the dust-removed combustion gas, and exhausting the deodorized gas into the air.

2. A non-draining type human waste disposal method according to claim 1, wherein said pulsating combustion gas is discharged to the dryer at 500°–600° C. after mixing with a secondary air.

3. A non-draining type human waste disposal method according to claim 1, wherein said pulsating combustion gas is generated by burning a fuel in a combustion chamber of a pulse combustor having sequentially on a same axis a combustion chamber equipped with at least one air charging pipe, at least one fuel charging pipe and at least one igniting means, and a combustion gas exhaust pipe having a gradually enlarged outlet, and said combustion chamber is connected with said combustion gas exhaust pipe by means of a constricted portion.

4. A non-draining type human waste disposal method comprising steps of discharging downward a pulsating combustion gas into a vertically cylindrical dryer from a pulse combustor disposed at the top of the dryer, making contact the pulsating combustion gas with residue-removed human waste, digester chamber sludges or their mixtures charged therein, turning the charged matters to dried powder and steam under the dryer conditions of 120°–150° C., withdrawing from the bottom of the dryer the dried powder and the combustion gas containing steam, charging the withdrawn material maintained at 120°–150° C. to an incinerator, incinerating odorous components and the dried powder entrained in the combustion gas containing steam under supply of a fuel and combustion air, dust-removing the incinerated matters, and exhausting the dust-removed gas into the air.

* * * * *